United States Patent

Cronin et al.

[11] Patent Number: 5,836,079
[45] Date of Patent: Nov. 17, 1998

[54] PIPE CUTTING TOOL

[76] Inventors: Michael E. Cronin, 7134 Antioch Rd., Middlegrove, N.Y. 12850; Frank L. Tavolacci, 100 Myrtle Ave., Hawthorne, N.Y. 10532

[21] Appl. No.: 655,692

[22] Filed: Jun. 3, 1996

[51] Int. Cl.$^6$ .................................................. B23D 21/08
[52] U.S. Cl. .............................................. 30/101; 30/102
[58] Field of Search ................... 30/96, 97, 99, 30/101, 102

[56] References Cited

U.S. PATENT DOCUMENTS

| | | |
|---|---|---|
| 195,307 | 9/1877 | Post . |
| 882,432 | 3/1908 | Thomas . |
| 1,242,931 | 10/1917 | Foringer . |
| 2,007,122 | 7/1935 | Briegel ...................... 81/198 |
| 2,379,177 | 6/1945 | Pavey ......................... 30/99 |
| 2,447,371 | 8/1948 | Sipsma et al. ............. 30/101 |
| 3,651,569 | 3/1972 | Arnot ......................... 30/95 |
| 3,715,804 | 2/1973 | Kelley ....................... 30/102 |
| 4,149,312 | 4/1979 | Arnot ......................... 30/98 |
| 4,177,557 | 12/1979 | Courty ....................... 30/102 |
| 4,305,205 | 12/1981 | Girala ....................... 30/102 |
| 4,416,062 | 11/1983 | Cummings .................. 30/101 |
| 4,438,562 | 3/1984 | Courty ........................ 30/99 |
| 4,493,150 | 1/1985 | Garcia et al. ............... 30/97 |
| 4,890,385 | 1/1990 | VanderPol et al. ......... 30/102 |
| 5,088,196 | 2/1992 | Fukuda ....................... 30/102 |

*Primary Examiner*—Hwei-Siu Payer
*Attorney, Agent, or Firm*—Heslin & Rothenberg, PC

[57] ABSTRACT

A self contained power driven, adjustable tube cutting tool is disclosed. Within the main tool housing is a rotatably mounted C-shaped body having an adjustable automatic cutter feeding and retract mechanism therein, operable by the rotational movement of the body about the pipe axis. Opposing a set of pipe backup rollers is a cutting wheel attached to post slidable through the center bores of two mating cylindrical bodies all on a common longitudinal axis. The mating faces are spirally configured through a single rotational turn to create linear expansion and contraction of the bodies as one, integrally attached to a ratchet wheel, rotates while the other does not. A spring biased pawl couples the non-rotational body to the sliding post. The ratchet wheel engages a second spring biased driving pawl pivotally attached to a cylindrical sliding roller body which protrudes from the periphery of the cutting wheel body. A stationary semicircular cam track is fixed within the main tool housing adjacent to the cutting wheel body periphery. As the body is rotationally driven the roller follows the profile of the cam track and hence the driving pawl moves in a radial direction inward to the pipe axis engaging and rotating the ratchet wheel, thus the two cylindrical bodies are then expanded and move the post and cutter in radially towards the pipe axis as it cuts.

22 Claims, 12 Drawing Sheets

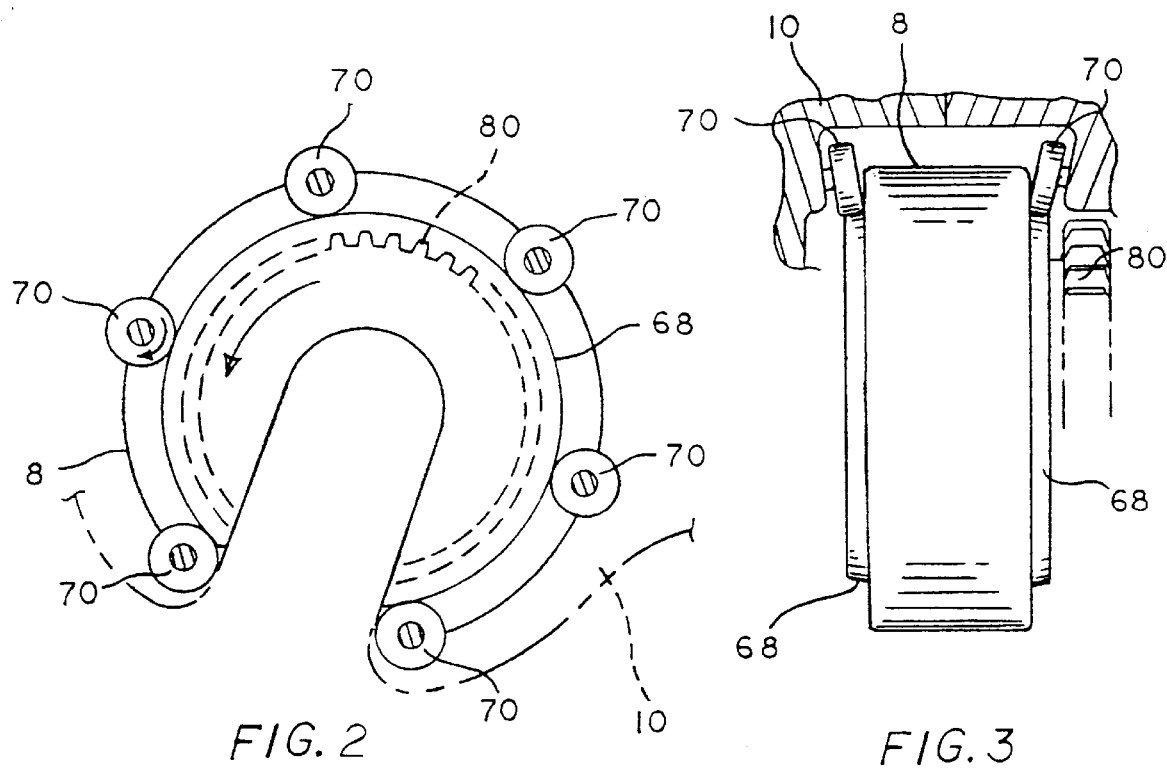

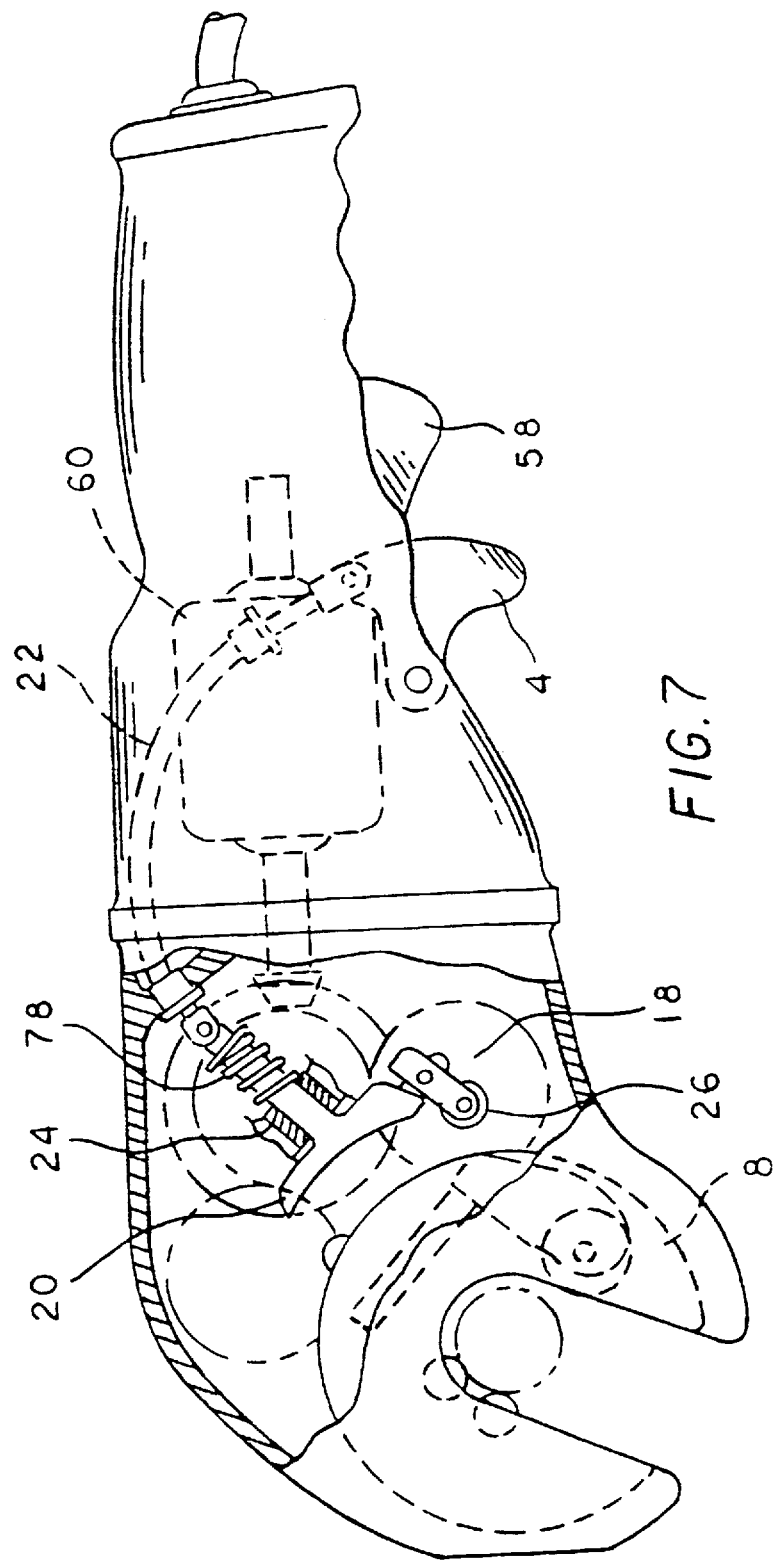

PIPE CUTTING TOOL

BACKGROUND—FIELD OF INVENTION

The present invention relates generally to portable pipe cutting tools, and more specifically to hand held, fully adjustable, automatic feed and retract tools intended for use in confined spaces.

BACKGROUND—DESCRIPTION OF PRIOR ART

Portable tube cutting tools are well known and can be either hand operated or power driven.

The prior known portable pipe cutting devices typically have a rotatable body with an opening forming a C-shape to receive the pipe to be cut. Attached within the body usually are support rollers to back up the pipe as it is being cut and opposing cutting means such as a cutting wheel or blade type cutting tool fastened to a cutting arm. Some of the previously known devices have an arm with cutting tool that is self feeding into the wall of the pipe. Prior art portable pipe cutters that are self feeding are described in U.S. Pat. No. 4,890,385 to VanderPol (1990) also self retracting and operable by an auxiliary power source such as an electric drill. However, this device accommodates only a single size pipe. Other prior known self feeding tube cutting tools are U.S. Pat. No. 4,493,150 to Garcia et al (1985) which is a very complex device thereby very expensive to manufacture and also requiring a separate driving motor. U.S. Pat. No. 4,416,062 to Cummings (1983) is a hand operated tool also very complex. A further prior known self feeding device is U.S. Pat. No. 4,305,205 to Girala (1981) a tube cutter assigned to NASA and extremely complex and hence would be prohibitively expensive to manufacture. The Girala device is hand operated but can optionally be coupled to an auxiliary power driving source. U.S. Pat. No. 4,149,312 to Arnot (1979) and U.S. Pat. No. 3,651,569 (1972) also to Arnot disclose a self feeding cutting means which is hand operable. Also a self feeding tube cutter is U.S. Pat. No. 2,007,122 to Briegel (1935). A hand operated device.

It can be noted that the majority of the prior art pipe cutting devices are of very complex design and hence very expensive to manufacture. The devices that can be power driven, thereby eliminating the physical exertion normally associated with manual operation, all require an attaching auxiliary motor. The prior known pipe cutting devices are cumbersome and slow to adjust with respect to manually advancing the cutting tool or wheel to place it on the marked cut off spot on the pipe or tube to be cut. This is particularly true when they are being manually adjusted while the tool is placed over an installed pipe that is confined in a place where space is limited.

OBJECTS AND ADVANTAGES

Accordingly, it is therefore an object of the present invention to provide the user with a tube cutting device that is "user friendly", convenient to use, quickly adjusting and with a cutting wheel that is both automatic feeding and retracting. This cutting mechanism would be part of a small lightweight, self contained electric motor powered tool intended for use in the field of building construction and building maintenance for use on installed pipe.

A further object of the present invention is to provide a tube cutting device that will easily adapt to use in confined areas.

In another aspect of the present invention, it provides the advantage of a way to quickly adjust the tool to accommodate different size pipe.

A further object of the present invention is to provide a simplified mechanism with which to automatically advance and retract the cutting means thereby reducing the manufacturing expense of the tool.

A still further object of the present invention is to provide a tool that is portable, small, lightweight and when placed around a pipe or tube to be cut, can instantly adjust the cutting wheel to clamp snuggly up against the tube wall ready to be cut.

It is an additional object of the present invention to provide a tube cutting mechanism that can be completely contained within a small tool housing having its own driving electric motor.

Further objects and advantages of this invention will become apparent from a consideration of the drawings and ensuing description.

BRIEF DESCRIPTION OF THE DRAWINGS

These and other advantages of the present invention will become more readily apparent upon reading the following detailed description and upon reference to the drawings.

FIG. 2 is a side view of the cutting wheel body and rollers.

FIG. 3 is a partial cross-sectional view of the main housing and an end view of the rollers and tracks.

FIG. 7 is a partial cut-away side view of a preferred embodiment of the present invention.

DETAILED DESCRIPTION—FIGS. 1 to 22

Figure 1:
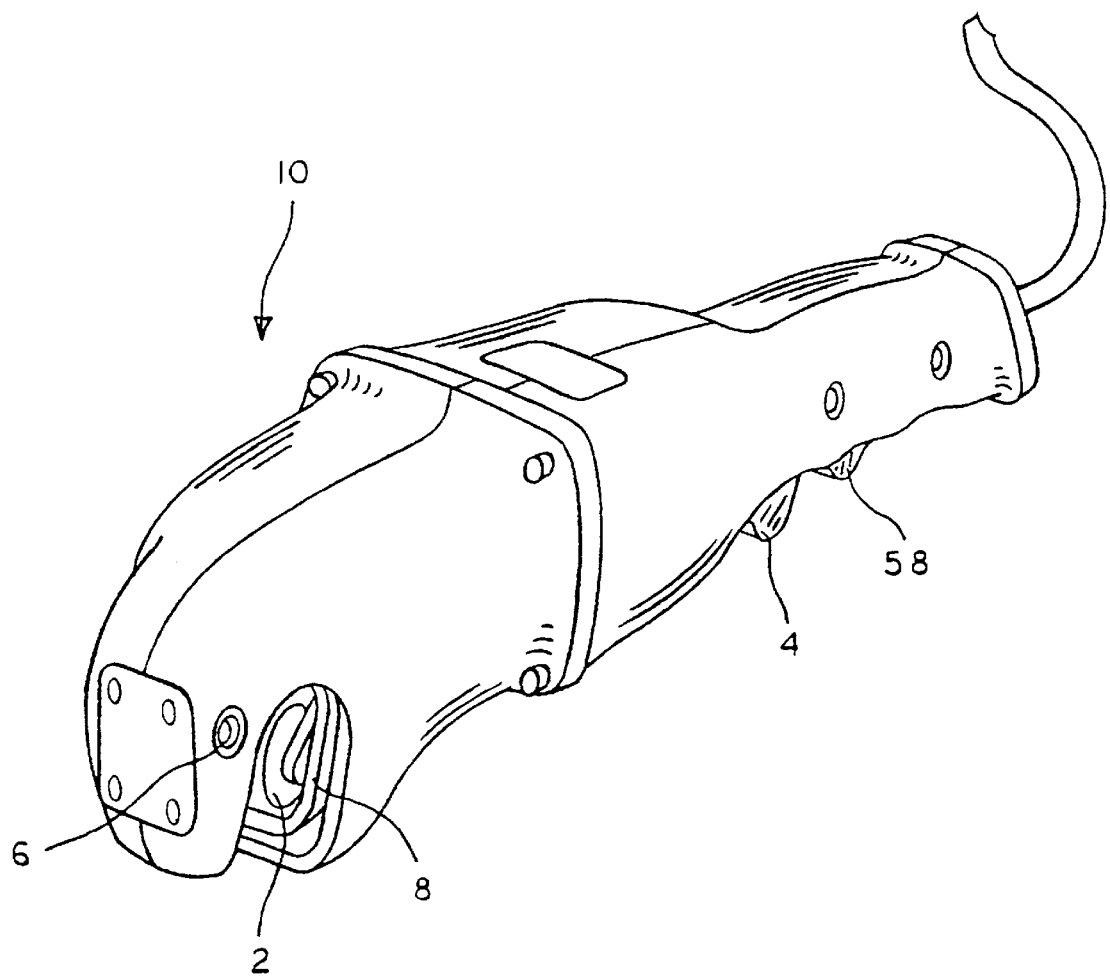
FIG. 1 is a perspective view of a preferred embodiment of the present invention.

Referring now to the drawings, specifically FIG. 1, there is illustrated a perspective view of a hand held, power driven, pipe cutting tool incorporating a fully adjustable, automatic cutter feeding and retract mechanism in accordance with a preferred embodiment of the present invention.

A C-shaped cutting wheel body 8 is rotatably mounted within the main tool housing 10 (FIGS. 2 and 3). Integrally part of the sides of the cutting wheel body 8 are semicircular tracks 68 which support the body with a plurality of rollers 70 fixed to the main tool housing 10 and equally spaced around a circle that is concentric with the peripheral circular shape of the cutting wheel body 8 and having concentric centers.

Figure 4:
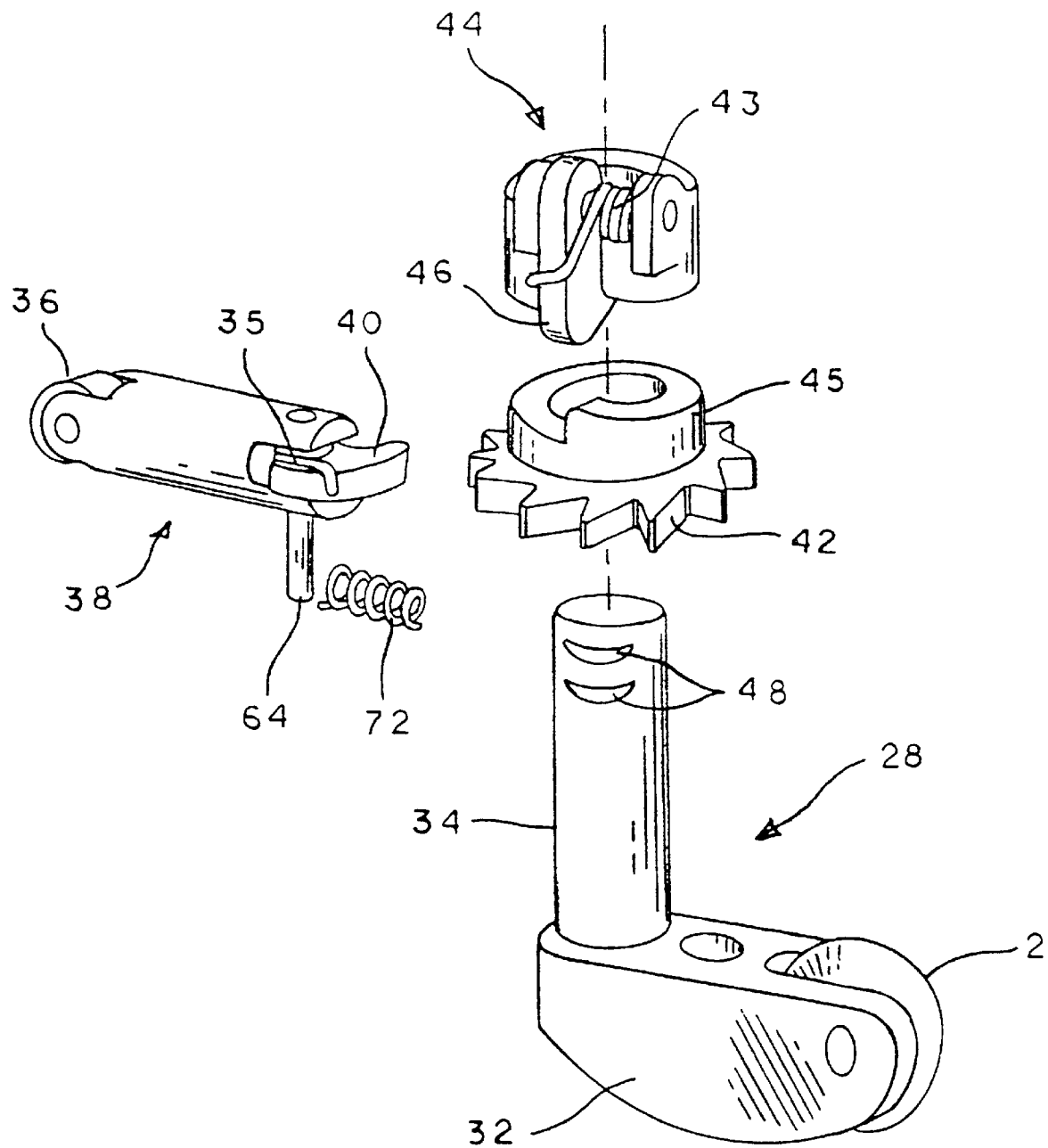
FIG. 4 depicts an exploded; perspective view of the primary mechanism, consisting of the cutting wheel, the cutting wheel arm and post, the integral cylindrical rotating body with ratchet wheel, and its mating nonrotating integral cylindrical body with its spring biased coupling pawl and the follower roller body with its spring biased driving pawl.
Figure 22:
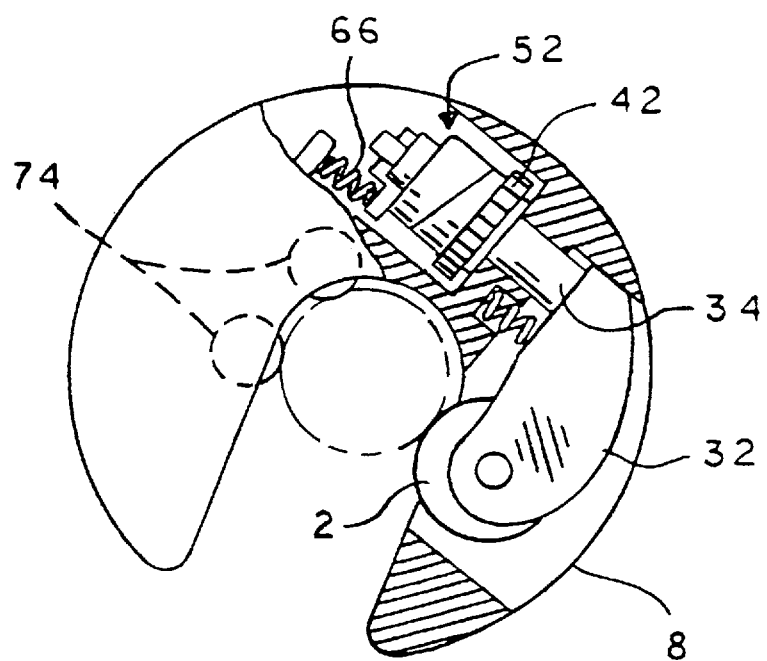
FIG. 22 is a side and partial cross sectional view of the cutting wheel body, the ratchet wheel, and the automatic return mechanism.

Contained within the cutting wheel body 8 is a simple cutting wheel advancing and retract mechanism (shown in FIGS. 4 and 22).

The mechanism has four basic main part assemblies (shown in an exploded view with parts in perspective FIG. 4). The first primary part assembly 28 comprises a rotatable cutting wheel 2 attached to an arm 32 joined to a post 34 which has a plurality of grooves 48 thereon. The second part is a non-rotating cylindrical body 44 with a spiral configuration on the face circumjacent to its bore at one end and with a pivotally mounted spring 43 biased pawl 46. The third part is a rotatable cylindrical body 45, joined to a ratchet wheel 42, which also has a spiral configuration on the face circumjacent to its bore at one end which correspondingly mates with the similarly spirally configured face of the non-rotating body 44. Ratchet wheel 42 is limited to one rotational direction by pawl 37 and biasing spring 39 (shown in FIG. 13). Fourth is a slidable cylindrical body 38 with a spring 72 biased guide pin 64 and spring 35 biased driving pawl 40 attached at a first end and with a roller wheel 36 attached to the second end.

Also within the cutting wheel body 8 (shown in FIG. 5) are two pipe backup rollers 74 retained within an adjustable backup roller body 16. The rollers 74 are positioned directly opposing the cutting wheel 2. The backup roller body 16 is retained in its passageway within the cutting wheel body 8 by an adjusting backup roller body support 14 pivotably mounted on an axis coinciding with the centerline of a pivot shaft 12 having a hex socket within its end. The pivot shaft is joined to the backup roller body support 14 which is offset to provide two preset positions of the backup rollers 74 relative to the pipe axis. A tension spring 76 biases the backup roller body 16 against the flat surfaces of the backup roller body support 14. The pivot shaft 12 is located and retained in the cutting wheel body 8 by two holes in the passageway walls on the same axis as the pivot shaft 12 and parallel to the rotational axis of the cutting wheel body 8.

A stationary semicircular cam track 62 (shown in FIG. 6) is fixed within the main tool housing 10 adjacent to the cutting wheel body 8 periphery and positioned on the same plane as the cylindrical roller body 38 so that it aligns with the roller follower 36. Cam track 62 profile will engage roller follower 36 for 90 degrees (one quarter of a revolution) rotation of cutting wheel body 8 with respect to main tool housing 10.

The cutting wheel rapid traversing mechanism 18 (shown in FIGS. 7, 8 and 9) comprises a slidable T-shaped body 20, its first end shaped to conform to the curvature of the cutting wheel body 8 and a second end coupled to a first end of a push-pull type cable 22. The cable 22 second end is coupled to a trigger mechanism 4.

The first end of T-body 20 (shown in FIG. 8 and 9) has a pivotally attached swing arm 54. A compression spring 56 is retained between first end 54a of the swing arm 54 and the body 20. Compression force of spring 56 is sufficient to overcome the compression force of a cutting wheel arm 32 retract spring 30 re-retained in the cutting wheel body 8. A second end 54b of swing arm 54 attaches to a roller 26.

The slidable T-body 20 (shown in FIG. 7) has a biasing compression spring 78 retained about its round shank. The body 20 is retained by and slides through a suitable bushing 24 which is retained within the main tool housing 10.

The cutting wheel body 8 has a conforming C-shaped driving spur gear 80 suitably attached to one side (shown in FIGS. 2, 3, 10, and 11). Gear 80 meshes with twin spur gears 82 and 83. Twin spur gears 82 and 83 mesh with spur gear 84 which is fastened to the same shaft as is bevel gear 86 (shown in FIGS. 10, and 11). Large bevel gear 86 then meshes with bevel pinion gear 88 suitably attached to the electric motor 60 shaft preferably built into tool grip handle. Electric motor 60 is preferably controlled by a trigger mechanism 58.

The electric motor 60 is preferably of the type which, when connected to an electronic motor controller, is capable of stopping the motor 60 and hence the cutting wheel body 8 rotational movement after a predetermined number of revolutions so that it will be in its initial position.

OPERATION OF INVENTION

Generally the tool is held in one hand and then the slot or opening in the main tool housing 10 is placed around the tubing or pipe to be cut off so that the pipe is within the slot or opening (shown in FIG. 1). The user then squeezes trigger 4 which instantly traverses the cutting wheel tightly against the wall of the pipe to be cut. A second trigger 58 is then squeezed activating an electric motor to rotationally drive a C-shaped cutting head 8 within the main tool housing 10 that automatically feeds the cutting wheel 2 into the tubing wall and when the tube has been severed automatically retracts the cutting wheel 2 and stops the cutting head in its initial position.

Figure 5:
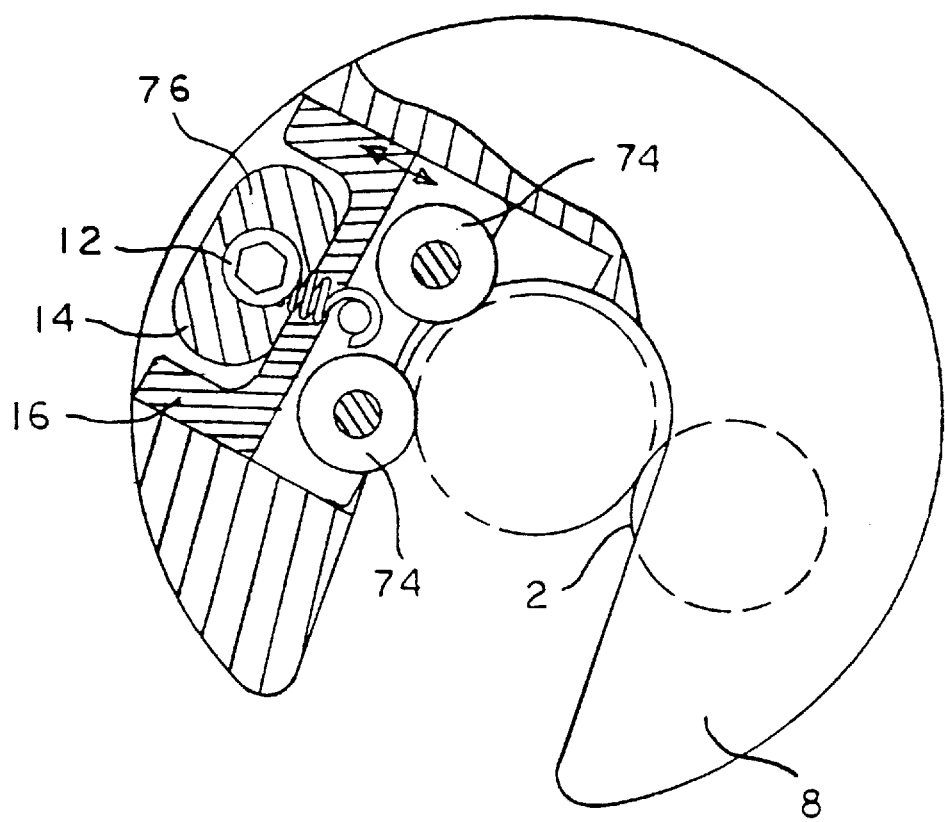
FIG. 5 is a partial cut-away view of the cutting wheel body of a preferred embodiment of the present invention showing the back up roller adjustment for the pipe size.
Figure 12:
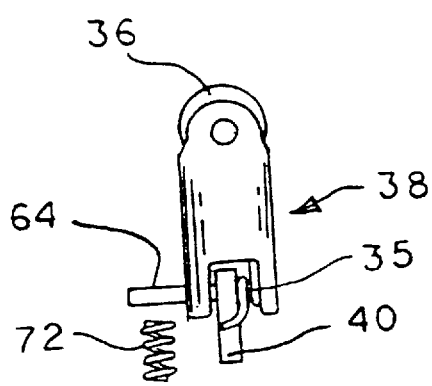
FIG. 12 is a side view of the cylindrical roller body and ratchet pawl mechanism shown in FIG. 13.
Figure 13:
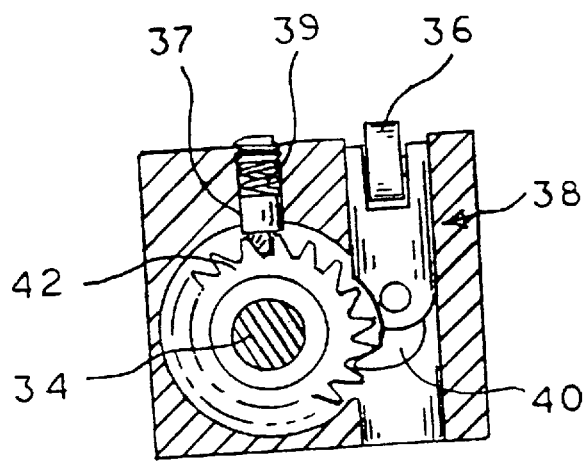
FIG. 13 is an enlarged cross sectional view of the ratchet wheel mechanism shown in FIG. 6.

More specifically, the user must first adjust the pipe backup rollers to accommodate either large or small diameter pipe (as can be seen in FIG. 5). One of the purposes of this adjustment is to enable the cutting wheel body 8 to rotate on a concentric axis relative to the pipe central axis.

The backup rollers are adjusted to accommodate a larger diameter pipe in FIG. 5. To adjust for a smaller diameter pipe an alien wrench is inserted through a hole 6 located in the main tool housing 10 (as shown in FIG. 1) and engages the hex socket in the end of the pivot adjusting shaft 12 enabling the backup roller body support 14 to be rotated 180 degrees. When this is done the backup roller body 16 slides within its passageway radially inward in a direction towards the central axis of the pipe and ultimately the backup roller body 16 is positioned against a predetermined off-set flat position of body 14 for a smaller diameter pipe.

Next when the tool is positioned over the pipe to be cut a first trigger 4 is then squeezed (see FIG. 7) to actuate the cutting wheel rapid traverse mechanism 18 to instantly traverse the cutting wheel 2 firmly against the wall of the tube to be cut.

More specifically, to traverse the cutting wheel 2 to contact the wall of a larger size pipe to be cut (see FIG. 9), the T-shaped body 20 advances until it makes contact with the periphery of the cutting wheel body 8. T-body 20 is advanced by squeezing a first trigger mechanism 4 coupled to the second end of the push-pull type cable 22 having its first end coupled to the second end of body 20 thereby sliding it through its bushing 24 within the main tool housing 10. Then simultaneously the roller 26 applies pressure to the periphery of the cutting wheel arm 32 as it rolls along the peripheral surface it overcomes the compression return spring 30 pressure and hence the cutting wheel arm post 34 slides through its bore within the cutting wheel body 8 allowing the cutting wheel 2 to make contact with the wall of the pipe to be cut. Also, concurrently when the T-body 20 makes contact with the periphery of the cutting wheel body 8, it also contacts the roller 36 attached to the first end of the slidable cylindrical body 38 (FIGS. 4,8,9,12 and 13). The roller 36 (shown in phantom lines in FIGS. 8 and 9) attached to a first end of the roller body 38, moves with the roller body 38 within its bore in a direction perpendicular to the cutting wheel body 8 rotating axis. Then, concurrently, the spring 35 biased driving pawl 40 attached to a second end of the roller body 38 engages a tooth in the ratchet wheel 42 (shown in FIGS. 13 through 21.). Hence, then the ratchet wheel 42 will rotate opening a gap within the mating surfaces of the non-rotating cylindrical body 44 and the rotating cylindrical body 45 (shown in FIG. 14). Then, concurrently, the spring 63 biased ratchet pawl 46 pivots and engages one of a plurality of grooves 48 in the cutting wheel post 34 and thereby will retain the cutting wheel arm 32 with the cutting wheel 2 against the wall of the pipe to be cut.

Figure 15:
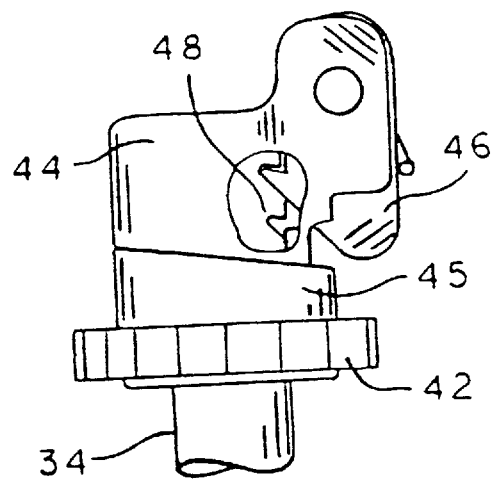
FIG. 15 is an enlarged side view, with partial cut-away showing engagement of spring biased pawl with cutting wheel post of first position as also shown in FIG. 14.
Figure 16:
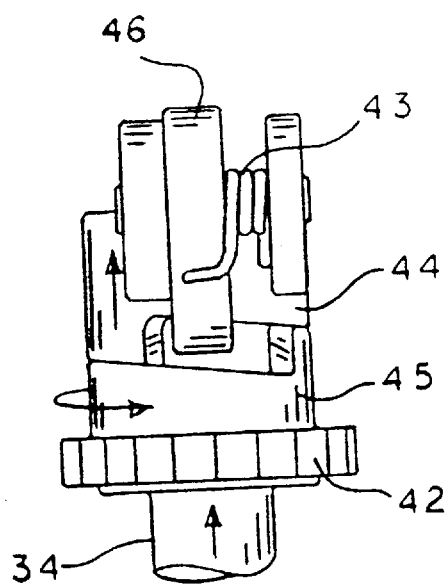
FIG. 16 is an enlarged view of the expanding and contracting cylindrical bodies in a second position.
Figure 17:
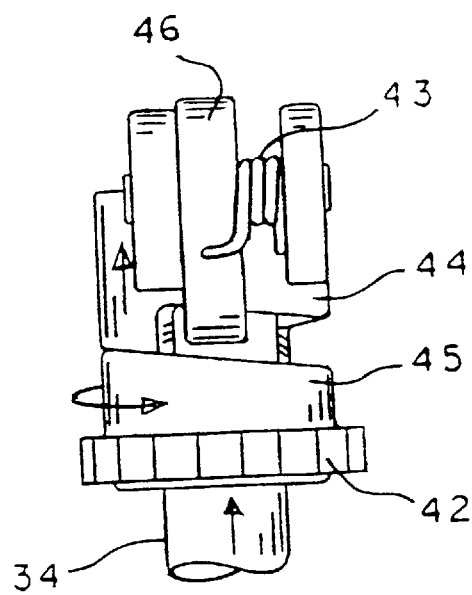
FIG. 17 is an enlarged view of the expanding and contracting cylindrical bodies in a third position.
Figure 18:
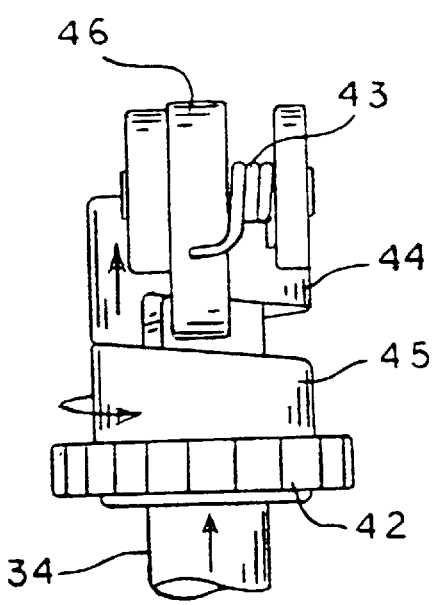
FIG. 18 is an enlarged view of the expanding and contracting cylindrical bodies in a fourth position.
Figure 19:
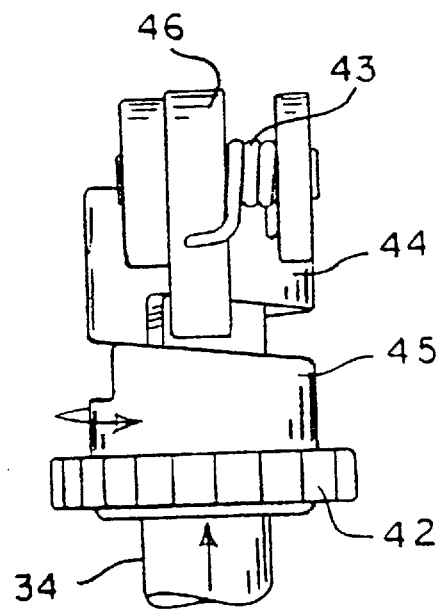
FIG. 19 is an enlarged view of the expanding and contracting cylindrical bodies in a fifth position.
Figure 20:
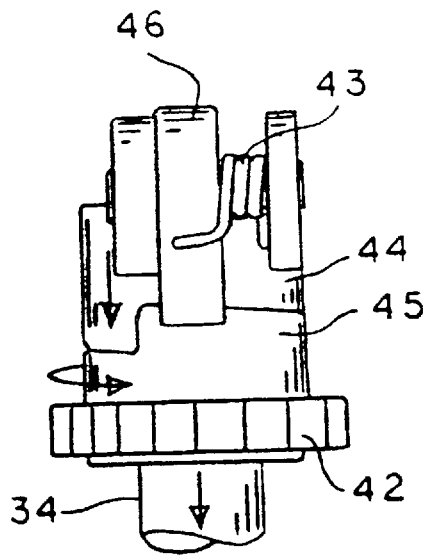
FIG. 20 is an enlarged view of the expanding and contracting cylindrical bodies in a sixth position and now being contracted.
Figure 21:
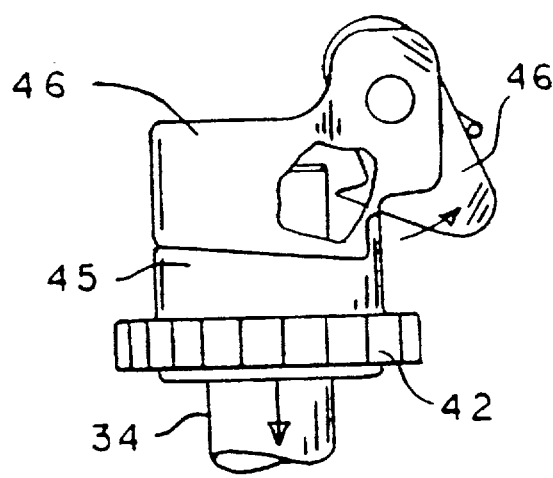
FIG. 21 is an enlarged side view of FIG. 20, with partial cut-away showing disengagement of spring biased pawl as it releases cutting wheel post to its retracted position.

Further cycling of the trigger mechanism 4 then will produce further rotation of the ratchet wheel 42 which is an integral part of the rotating body 45. As body 45 rotates about the axis of the cutting wheel arm post 34, concurrently the post 34 will slide longitudinally through the bore of rotating body 45 because body 45 is retained as a flat face circumjacent to its bore (at opposite end of spiral configuration) bears against a like face 50 in body 8 (as shown in FIG. 22). As body 45 rotates its spiral face mates with the like spiral face of the non-rotating body 44 thereby producing a lengthening or linear expansion of the bodies 52 as shown in FIG. 16. The non-rotating body 44 coupled to the cutting wheel arm post 34 by the spring 43 biased pawl 46 (as shown in FIG. 15) will then draw the cutting wheel sufficiently tight against the wall of the tube to be cut.

It is additionally noted that, concurrently with the aforementioned trigger cycling, swing arm 54 pivots because the compression spring 56 force is overcome as the movement of the cutting wheel 2, its arm 32 and post 34 is limited because of a larger pipe diameter.

The same mechanical movement takes place when the cutting wheel rapid traverse mechanism accommodates a smaller diameter pipe (shown in FIG. 8) with one exception. The compression spring 56 force bearing against the first end 54a of the swing arm 54 is greater than the compression spring 30 force to retract the cutting wheel 2, its arm 32 and post 34 therefore the swing arm 54 will not pivot as the cutting wheel 2 traverses further in the direction of the central pipe axis to accommodate a smaller diameter pipe.

Once the tool 10 has been positioned around the pipe to be cut off and the first trigger mechanism 4 cycled enough times to sufficiently clamp the cutting wheel against the wall of the pipe then the first trigger 4 is released. Now the second trigger 58 is squeezed activating the electric motor 60, (shown in phantom lines FIGS. 7, 10 and 11) which then drives, through a gear train (shown in FIGS. 10 and 11), the cutting wheel body 8 continuously through a 360 degree rotational axis. Within the cutting wheel body 8 there is an automatic cutting wheel feeding and retract mechanism operable by the rotational movement of the cutting wheel body 8 about its axis.

Figure 6:
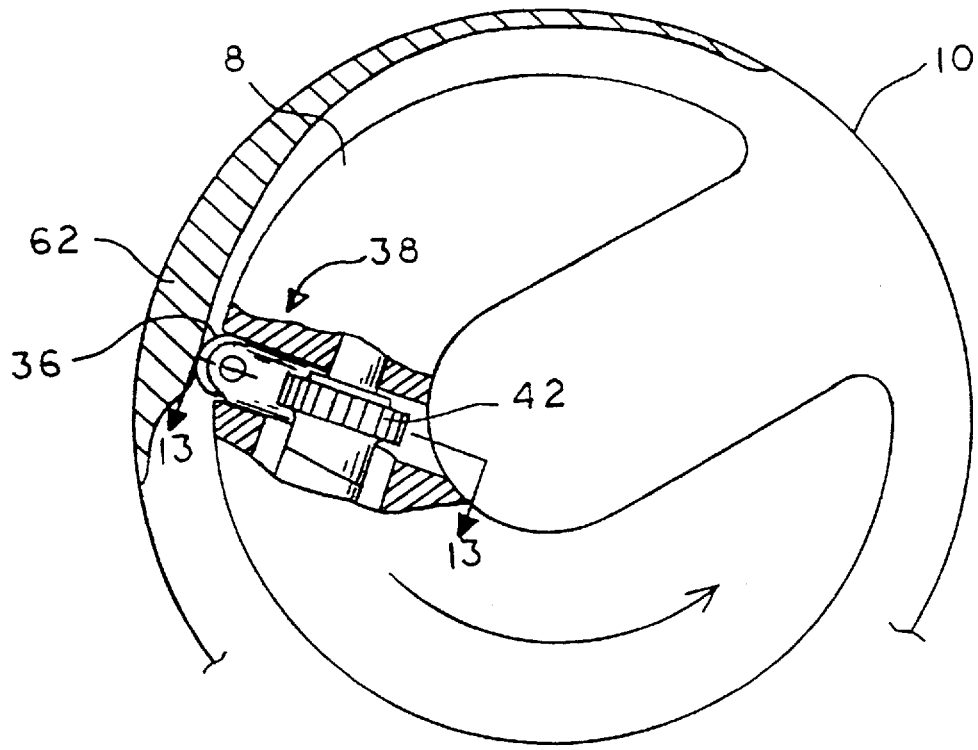
FIG. 6 is a side view of the fixed cam track and a partial cut-away view of the follower roller body adjacent to the ratchet wheel.
Figure 9:
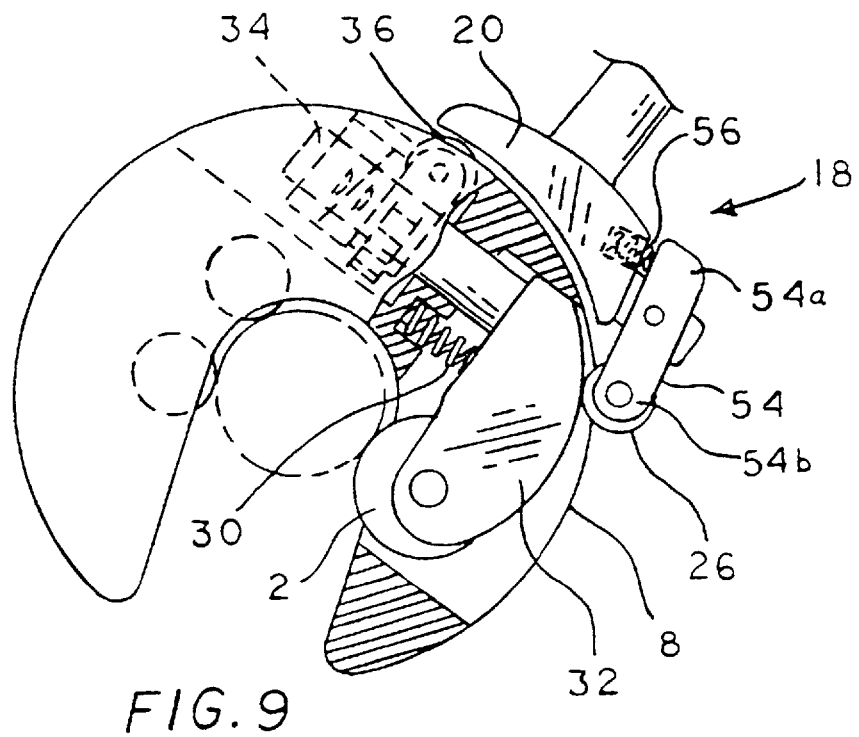
FIG. 9 is a partial cut-away view of the cutting wheel body with mechanism adjusted to accommodate a larger diameter pipe and a side view of the rapid traverse mechanism.
Figure 8:
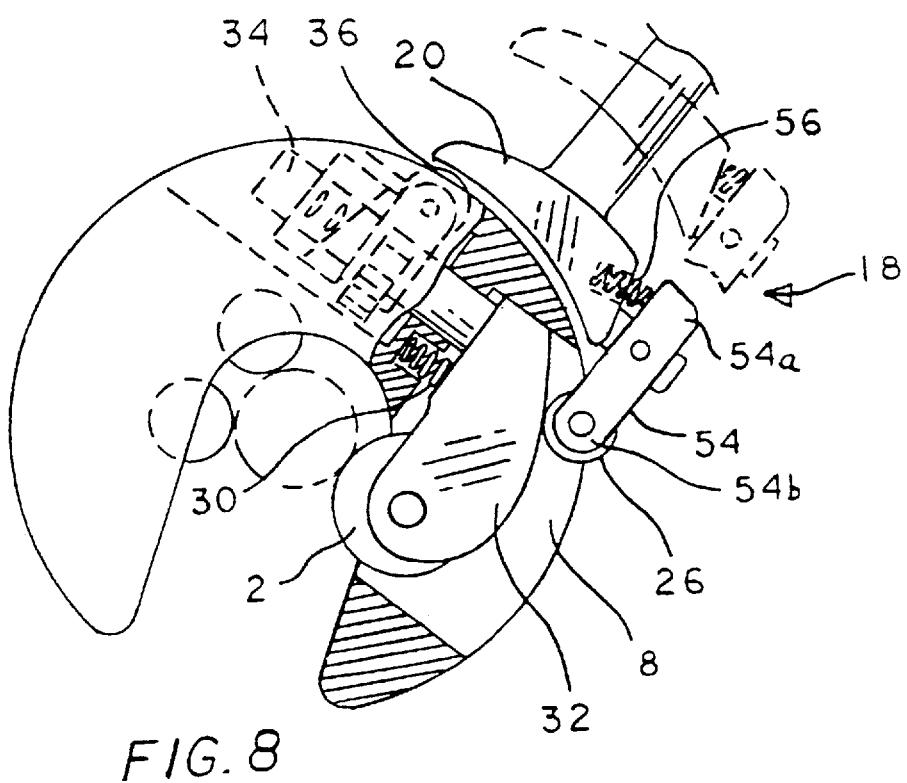
FIG. 8 is a partial cut-away view of the cutting wheel body with mechanism adjusted to accommodate a smaller diameter pipe and a side view of the rapid traverse mechanism.
Figure 10:
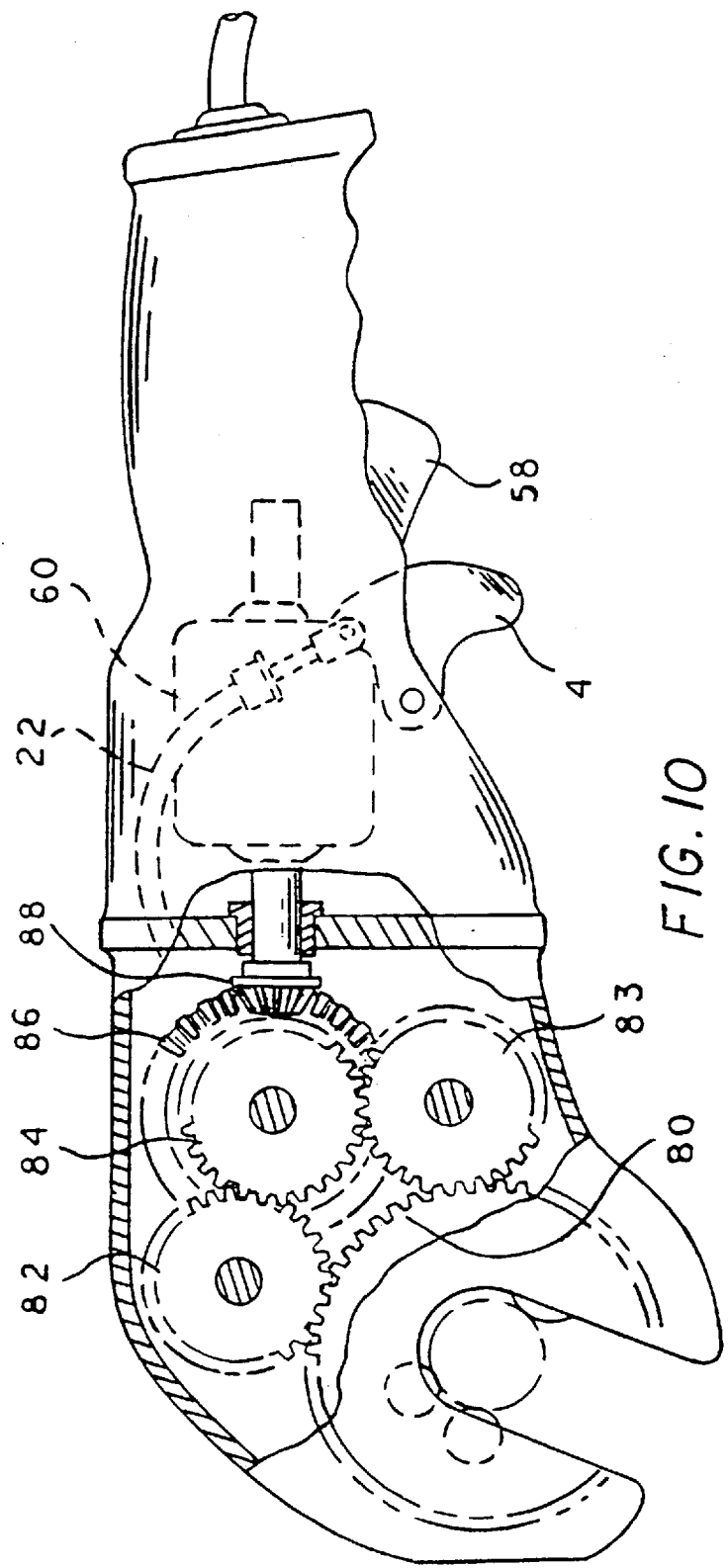
FIG. 10 is a partial cut-away view of a preferred embodiment of the present invention showing a side view of a driving gear train.
Figure 11:
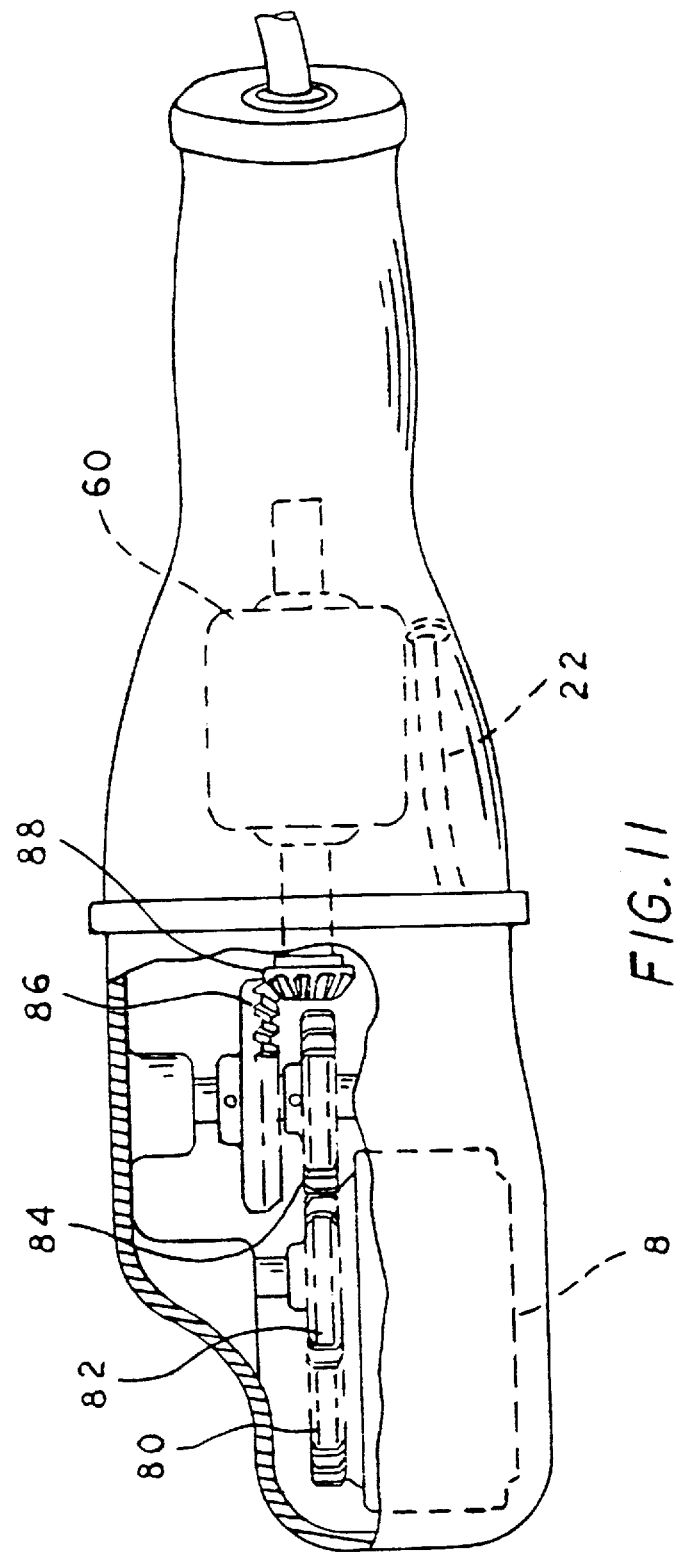
FIG. 11 is a partially cut-away top or plan view of the preferred embodiment of the present invention showing the driving gear train.
Figure 14:
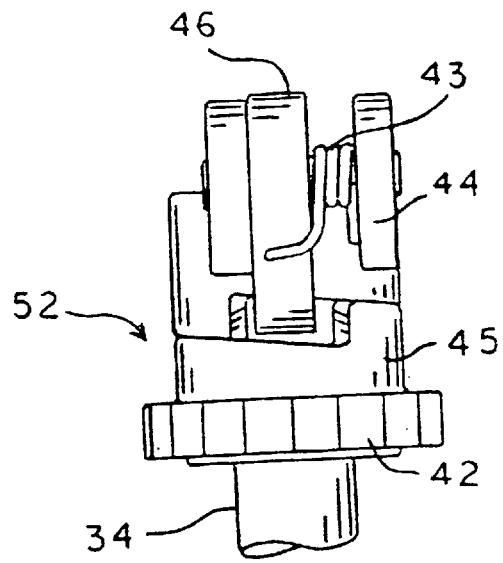
FIG. 14 is an enlarged view of the expanding and contracting cylindrical bodies in a first position.

More specifically, as the cutting wheel body 8 is rotationally driven by the gear train (FIG. 10 and 11), the roller 36 attaching to a first end of the cylindrical sliding body 38 protrudes from the periphery of the cutting wheel body aligning with and follows along the profile of the stationary cam track 62 fixed within the main tool housing 10 (as shown in FIG. 6). The roller body 38 alignment with respect to cam track 62 (shown in FIGS. 6 and 12) is maintained by a guide pin 64, which also serves to support the compression return spring 72 for the roller body 38, that is retained in a slot (not shown) within body 8.

As roller 36 follows the profile of the stationary cam track 62 and as it follows it to its profile peak, the roller body 38 moves within its bore in a direction perpendicular to the cutting wheel body 8 rotational axis (FIG. 6). Then, concurrently, the spring 35 biased driving pawl 40 attached to a second end of the roller body 38 engages a tooth in the ratchet wheel 42 (shown in FIGS. 13 through 21). Hence, then the ratchet wheel 42 will rotate cylindrical body 45 and as its spiral face mates with the like spiral face of the non-rotating body 4A thereby produce a lengthening or linear expansion of the two bodies 52 along the coaxially shared longitudinal axis of the cutting wheel post 34 (as first shown in FIG. 14). The cutting wheel post 34 being coupled by the pawl 46 to the non-rotating body 44 then will move the cutting wheel 2 incrementally 0.009 of an inch deeper into the wall of the pipe being cut upon each revolution of the cutting wheel body 8 as the non-rotating body 44 moves incrementally in the direction of the arrow shown in subsequent incremental movements (shown in FIGS. 16,17,18, and 19).

Then, just after the pipe has been cut off, the rotational body 45 will have completed one revolution and as the peak end of its spiral configuration continues to rotate past the peak end of the spiral configuration of the non-rotating body 44 then the bodies will be contracted (shown in FIG. 20) by the force of the compression return spring 66 (shown in FIG. 22). Concurrently the spring biased pawl 46 is then forced to release the cutting wheel post 34 as it is forced past the edge of the spiral configuration near its peak of the rotating body 45 during contraction (shown in FIG. 21) which is a partial cut-away side view of FIG. 20. Then as the cutting wheel post 34 is released, concurrently, the cutting wheel 2 returns to its retracted position.

Concurrently as the cutting wheel 2 retracts the electric motor 60, connected to an electronic controlling device, will stop the cutting wheel body 8 rotational movement after a predetermined number of revolutions thereby positioning the opening in the cutting wheel body 8 so that it will coincide with the opening in the main tool housing 10 and be in its initial position at the end of each cut-off cycle.

SUMMARY, RAMIFICATIONS AND SCOPE OF INVENTION

Thus the reader will see that the subject invention can be used quickly and conveniently to cut pipe and tubing, and also installed pipe where space is very restricted because it is a self contained, small, light weight device. In addition, it provides a way to instantly adjust the tool for pipe size with one simple half turn adjustment and to instantly traverse the cutting wheel snuggly against the wall of the tubing to be cut by simply pulling a trigger. Preferably, the cutting wheel body within the main tool housing is driven rotationally by an electric motor controlled by squeezing a second trigger in tandem location with the first. Said cutting wheel body has a simple automatic cutting wheel feeding and retract mechanism within it. Further, by virtue of simple design the mechanism can be inexpensively manufactured.

Although the mechanism of the present invention is preferably power driven, a similar mechanism can alternately be contained in a modified embodiment of the present invention and be alternately completely manually operated.

While the above description contains many specifications, these should not be construed as limitations on the scope of the invention, but rather as an exemplification of one preferred embodiment thereof. Many other variations are possible. For example to cut plastic pipe. Accordingly, the scope of the invention should be determined not by the embodiments illustrated, but by the appended claims and their legal equivalents.

What is claimed is:

1. A pipe cutting device incorporating a C-shaped body rotatably mounted within a main housing, said C-shaped body incorporating within its opening a plurality of pipe support rollers positioned opposing a cutting tool suitably mounted to a self feeding and retracting mechanism operable by a rotational movement of said C-shaped body, with respect to said main housing and about a central axis comprising:

(a) within said C-shaped body two aligned members of said mechanism positioned in tandem, with one or more of said members spirally configured at one end, and the second member attached to the cutting tool suitably positioned on an axis perpendicular to said central axis, so that as one of said members rotates about its axis the second member, attached to said cutting tool, will be advanced radially inward to said central axis thereby advancing the cutting tool into the wall of a pipe;

(b) ratchet teeth on the periphery of said spirally configured member adapted to engage a pawl suitably mounted so as to limit its rotation to one direction and to operatively engage said spirally configured member with a second pawl to rotationally drive said spirally configured member responsive to the rotational movement of said C-shaped body, said second pawl attaching to a longitudinal member positioned perpendicularly to said central axis, protruding from said C-shaped body and operatively following profile of a cam track fixed within said main housing;

(c) means to retract said cutting tool, after said pipe has been cut off, said means being operable after one complete revolution of said spirally configured member whereby as the peak end of said spiral continues to rotate past the peak end of said member attached to said cutting tool said members will be contracted by a biasing means and concurrently said cutting tool will operatively be released to its retracted position;

(d) static adjustment means for one or more pipe backup rollers mounted in a slidable member within a passageway located on an axis perpendicular to said central axis, thus enabling said pipe backup support rollers to accommodate a plurality of diametrical pipe sizes, said adjustment means incorporating a pivotally adjustable, predetermined off-set body having a plurality of rotatable support flats joined to a suitable hex socket;

(e) means operatively attached to said main housing for static traversing of said cutting tool so that said tool is traversed from its fully retracted position to the wall of the pipe to be cut.

2. A tubular member severing device having mounted within a main housing a rotatably driven C-shaped body incorporating one or more suitable tube support rollers disposed within an aperture, said one or more support rollers opposing an automatic cutting means operable by rotational movement of said C-shaped body about a central axis comprising:

(a) within said C-shaped body, two co-axially aligned cylindrical bodies positioned in tandem with one or more of said cylindrical bodies spirally configured at one end, one of said cylindrical bodies being attached to a cutting tool post positioned perpendicularly to said central axis so that as one cylindrical body rotates, said cylindrical bodies feed said post with a cutting tool radially into a wall of a tube being cut, and means to rotationally drive said spirally configured cylindrical body responsive to rotational movement of said C-shaped body, said means to rotationally drive comprising a longitudinal member positioned perpendicularly to said central axis, said longitudinal member protruding from said C-shaped body and adapted to operatively following a profile of a cam track fixed within said main housing;

(b) means operatively attached to said main housing for traversing the cutting tool relative to the tube wall when said C-shaped body is stationary; and (c) means within said main housing for rotating said C-shaped body about said central axis.

3. The device according to claim 2, wherein one of said co-axially aligned cylindrical bodies is joined with a rotatable ratchet wheel and has a center bore of a predetermined diameter.

4. The device according to claim 3, further including a spiral configuration on one face circumjacent to said center bore.

5. The device according to claim 3, wherein said cylindrical body joined to said ratchet wheel is rotationally driven by means comprising:

(a) a biased driving pawl means adapted to engage said ratchet wheel and attached to said longitudinal member positioned on an axis perpendicular to said central axis, said longitudinal member having an opposite end with a follower means protruding slightly from said C-shaped body;

(b) said means for rotationally driving said ratchet wheel being provided as said follower means operatively follows profile of said fixed cam track within said main housing so as to incrementally rotate said ratchet wheel upon each revolution of said C-shaped body.

6. The device according to claim 3, wherein the other of said coaxially aligned cylindrical bodies is joined to a pivotal biased pawl and has a center bore of a predetermined diameter.

7. The device according to claim 6, further including a spiral configuration on one face circumjacent to said center bore and mating with at least one of said one or more of said cylindrical bodies.

8. The device according to claim 6, wherein said cutting tool post is joined to an arm, and wherein said arm retains said cutting tool, and said post has a plurality of longitudinally parallel grooves in its circumferential surface.

9. The device according to claim 8, wherein said post is slidably retained within said C-shaped body and slidable on an axis perpendicular to said central axis.

10. The device according to claim 9, wherein said post is slidably attached, operatively through the center bores of said axially aligned cylindrical bodies, to said pivotal biased pawl.

11. The device according to claim 10, further comprising means to retract said cutting tool post, said means to retract being operable upon one complete revolution of said cylindrical bodies having said spirally configured end, wherein a biasing means releases said cutting tool post to its retracted position.

12. The device according to claim 2, further including retained within said C-shaped body a plurality of tube backup support rollers mounted in a slidable member within a passageway located on an axis perpendicular to said central axis, thus enabling said tube backup support rollers to accommodate a plurality of pipe diametrical sizes by a static adjusting means.

13. The device according to claim 12, wherein said adjusting means comprises a pivotally adjusting off-set body having a plurality of rotatable support flats joined to a suitable hex socket enabling static pivotal adjustment to be made using a suitable wrench.

14. The device according to claim 2, wherein said means operatively attached to said main housing for traversing of said cutting tool so that said cutting tool is traversed from its fully retracted position in radially to contact the wall of the tube to be cut comprises:

(a) an approximately T-shaped body operative and slidably retained within said main housing;

(b) a biased swing arm pivotally attaching to a first side of said T-shaped body and retaining a roller suitably positioned so that said roller operatively follows convex configuration of said cutting tool post thus traversing said cutting tool to contact the tube wall to be cut; and (c) a second side of said T-shaped body operatively contacts a roller follower protruding from said C-shaped body.

15. The device according to claim 2, wherein said drive means is within said main housing and operatively connected to said C-shaped body enabling said C-shaped body to rotate with respect to said main housing and about said central axis.

16. The device according to claim 15, further including a rotational drive means within said main housing comprising a motor means.

17. A pipe cutting device comprising:

a main housing having a rotatable pipe receiving member therein;

one or more pipe support rollers operatively engaged to said pipe receiving member;

a cutter operatively engaged to said pipe receiving member and oriented wherein a pipe to be cut is positioned between said cutter and said one or more pipe support rollers;

a motor operatively engaged to said cutter to revolve said cutter relative to said main housing about an axis of revolution to cut said pipe;

a static cutter adjustment mechanism adapted to adjust the position of said cutter relative to said one or more pipe support rollers wherein said cutter is adjusted to contact said pipe by operation of said static cutter adjustment mechanism, wherein said static cutter adjustment mechanism comprises a linkage which contacts a support arm to move said cutter towards said pipe; and a dynamic cutter adjustment mechanism operatively engaged to said cutter to adjust the position of said cutter to cut said pipe as said cutter revolves about said axis of revolution, wherein said dynamic cutter adjustment mechanism comprises a cam and a follower, said follower being within said housing and said cam being operatively engaged to said cutter.

18. The pipe cutting device of claim 17 wherein said pipe receiving member rotates with said cutter.

19. The pipe cutting device of claim 17 wherein said static cutter adjustment mechanism comprises a trigger which operates said linkage.

20. The pipe cutting device of claim 17 or 19 wherein said cam is operatively engaged to a ratchet wheel wherein rotation of said ratchet wheel by movement of said cam translates said cutter towards said pipe while said cutter revolves about said axis of revolution.

21. The pipe cutting device of claim 20 wherein said ratchet wheel is connected to a first cylindrical body, said first cylindrical body being operatively engaged to a second cylindrical body operative connected to said cutter, wherein rotation of said first cylindrical body by movement of said cam translates said second cylindrical body and said cutter.

22. The pipe cutting device of claim 21 wherein said first cylindrical body comprises a spiral shaped end and said second cylindrical body comprises a spiral shaped end mating with the spiral shaped end of said first cylindrical body wherein rotation of said ratchet wheel causes said spiral shaped end of said first cylindrical body to rotate relative to said second cylindrical body wherein contact between said spiral ends translating said second cylindrical body and said cutter.

* * * * *